(12) United States Patent
Sharma et al.

(10) Patent No.: US 10,686,678 B2
(45) Date of Patent: Jun. 16, 2020

(54) DEVICE FOR ORCHESTRATING DISTRIBUTED APPLICATION DEPLOYMENT WITH END-TO-END PERFORMANCE GUARANTEE

(71) Applicant: HEWLETT PACKARD ENTERPRISE DEVELOPMENT LP, Houston, TX (US)

(72) Inventors: Puneet Sharma, Palo Alto, CA (US); Aisha Syed, Salt Lake City, UT (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 63 days.

(21) Appl. No.: 15/990,554

(22) Filed: May 25, 2018

(65) Prior Publication Data

US 2019/0363954 A1 Nov. 28, 2019

(51) Int. Cl.
*H04L 12/24* (2006.01)

(52) U.S. Cl.
CPC ...... *H04L 41/5054* (2013.01); *H04L 41/5019* (2013.01); *H04L 41/5035* (2013.01); *H04L 41/5096* (2013.01)

(58) Field of Classification Search
CPC ............. H04L 41/5019; H04L 41/5035; H04L 41/5096
See application file for complete search history.

(56) References Cited

U.S. PATENT DOCUMENTS

| | | | |
|---|---|---|---|
| 9,595,054 B2 | 3/2017 | Jain et al. | |
| 2009/0225654 A1 | 9/2009 | Sharp | |
| 2011/0035248 A1 | 2/2011 | Juillard | |
| 2015/0134823 A1 | 5/2015 | Cucinotta et al. | |
| 2016/0299772 A1* | 10/2016 | Seenappa | G06F 9/45558 |
| 2016/0359823 A1* | 12/2016 | Ayyadevara | H04L 63/061 |
| 2017/0105113 A1* | 4/2017 | Seenappa | H04W 24/02 |
| 2017/0192825 A1 | 7/2017 | Biberman et al. | |

OTHER PUBLICATIONS

Baldini, I. et al., Serverless Computing: Current Trends and Open Problems, (Research Paper), Jun. 10, 2017, 20 Pgs.

(Continued)

*Primary Examiner* — El Hadji M Sall
(74) *Attorney, Agent, or Firm* — McDermont Will & Emery

(57) ABSTRACT

A method for receiving, in an application orchestrator, a request for executing an application. The method includes identifying a function sequence to complete the application, each function in the function sequence is executed in one instance, and identifying an instance chain of the functions to complete the application, wherein the instance chain includes an instance for each function in the function sequence. The method includes tracking a performance of each instance for each function in the chain, and selecting an application execution route based on the performance that includes the instance chain of the functions to complete the application. The method includes allocating a server resource to each instance for each function and modifying the application execution route based on a performance and a performance policy. A system and a computer readable medium storing instructions to perform the above method are also provided.

20 Claims, 10 Drawing Sheets

(56) References Cited

OTHER PUBLICATIONS

Baresi, L. et al., Empowering Low-Latency Applications through a Serverless Edge Computing Architecture, (Research Paper), Sep. 2017, 16 Pgs.

Hendrickson, S. et al., Service Level Guarantees for Serverless Applications, (Master's Thesis), 2016, "Serverless Computation with OpenLambda," in 8th Workshop on Hot Topics in Cloud Computing (HotCloud 16) 2016 1 Pg.

McGrath, G. et al., Serverless Computing: Design, Implementation, and Performance, (Research Paper), Jul. 17, 2017, Published in: Distributed Computing Systems Workshops (ICDCSW) 2017 IEEE 37th International Conference 6 Pgs.

Shekhar, S. et al., Dynamic Resource Management Across Cloud-edge Resources for Performance-sensitive Applications, (Research Paper), Retrieved Mar. 22, 2018, 4 Pgs.

Top Reasons to go 'Serverless' in the Cloud, (Web Page), Sep. 12, 2017, 3 Pgs.

International Search Report and Written Opinion received for PCT Application No. PCT/US2019/033954, dated Aug. 16, 2019, 15 pages.

\* cited by examiner

DEVICE FOR ORCHESTRATING DISTRIBUTED APPLICATION DEPLOYMENT WITH END-TO-END PERFORMANCE GUARANTEE

BACKGROUND

With the advent of cloud computing, network based applications are increasingly hosted by multiple servers, each performing different portions of an end-to-end application functionality. Given the heterogeneity of computational resources and traffic in the cloud, the performance of each of the functions on multiple servers in a given chain of functions becomes a probabilistic event whose outcome is not deterministic. Accordingly, end-to-end performance of application functionality (e.g., latency) becomes a random variable that is difficult to predict. Some approaches request the application developer or application user to specify this resource allocation information for each function instance, detracting from a server-less experience for the application user and the application developer. Moreover, cloud platforms as designed today do not offer performance guarantees beyond statistically significant information, which is typically insufficient for an accurate operation to meet end-to-end/overall performance goals.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
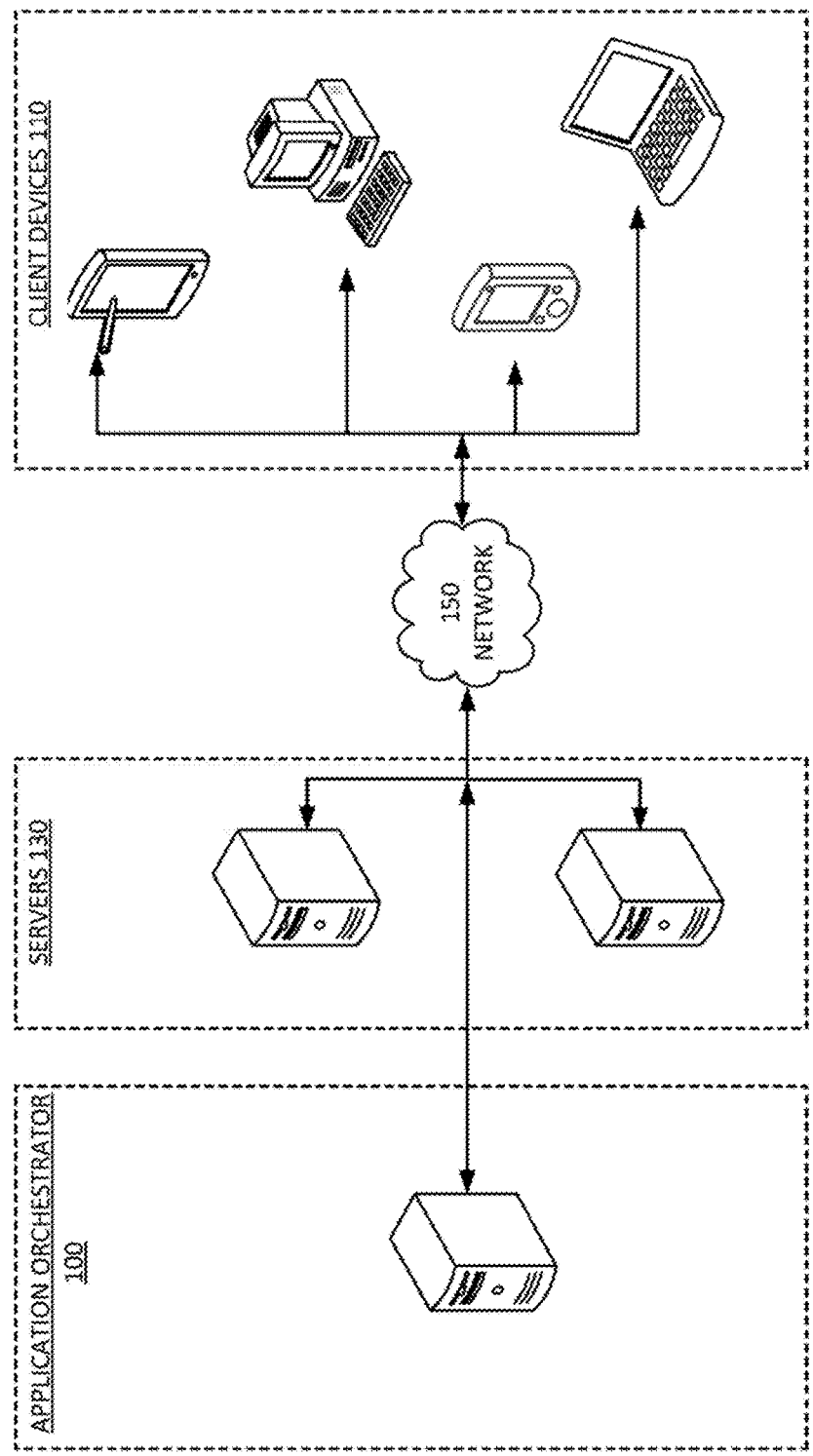
FIG. 1 illustrates an example architecture suitable for deployment of a server-less application in a cloud computing environment, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

The present disclosure relates to management and control of cloud computing applications. More specifically, the present disclosure relates to server-less application deployment to guarantee end-to-end performance. Cloud computing platforms are rife with uncertainty as to end-to-end performance of applications, which makes it impractical for cloud providers to provide concrete guarantees for server-less applications. Embodiments as disclosed herein enable application providers to set up performance-based service level agreements that include specific probabilistic guarantees, e.g., a 95% probability to have an end-to-end application latency of less than 100 ms.

Cloud computing applications as disclosed herein may include "Fog," "Edge," or "server-less" computing where the application functions are distributed and deployed closer to the edge (e.g., the user end), thus enabling cloud like compute access with very low latencies. Embodiments as disclosed herein offer server-less computing on a distributed cloud that provides cloud capabilities to customers without exposing the cloud itself. Accordingly, in some embodiments application developers do not need to specify server configurations, scaling factors, and other characteristics and resources of the cloud servers. Instead, in some embodiments an application developer only provides the code for their applications (e.g., micro-services), with a set of small self-contained functions linked together to create the application. Each function may include an individual value of a performance characteristic (e.g., a latency or throughput), and therefore the end-to-end application performance value may be a sum of the individual performance values of the function sequence of that application. For example, in some embodiments each function has an individual response time (e.g., latency), and inter-function latencies are present as well. In some embodiments, an application user or developer may want to specify performance policies capturing the end-to-end requirements of their applications and this is what we need to guarantee as the cloud management solutions provider. This is challenging since underlying cloud platforms are inherently probabilistic and current server-less offerings from major providers do not provide such end-to-end (e2e) guarantees. Additionally, some application platforms may ask application developers to specify CPU/memory requirements for their functions thus exposing the servers in what should be a server-less experience.

Embodiments as disclosed herein resolve the problem of having to expose server resource allocation/configuration in a cloud computing environment to application developers by characterizing the uncertainty in the underlying cloud platform and performing a probabilistic provisioning for the applications. The subject system and methods provide several advantages, including meeting end-to-end performance requirements of application developers, and enabling end-to-end application specifications that make true server-less experience possible.

The proposed solution further allows an application developer to focus on application-specific functionality rather than cloud computing setup and configuration. This allows the application provider to develop more efficient applications and the applications themselves to run more efficiently in the cloud architecture, thereby improving the user experience and satisfaction.

Embodiments as disclosed herein enable customers to specify performance-based service level agreements or policies in a probabilistic declarative language. The declarative nature of the specification allows them to focus on the intent or 'what' they want rather than specifying the mechanisms or 'how' their policies will translate to underlying implementation. The probabilistic nature of the policy specification language complements the probabilistic guaranteeing mechanism provided by the cloud architecture.

Embodiments as disclosed herein reduce energy and resource usage costs for cloud providers by enabling optimal placement of functions in the edge/cloud. As examples of a function performance characteristic, response times, latencies, and throughput may be included as performance characteristics of functions. Accordingly, in some embodiments the optimization takes advantage of the insight that individual function response times and inter-function latencies in applications can be variable and high (and do not have to be the best possible) as long as end-to-end app guarantees are met.

Embodiments as disclosed herein provide the further advantage of enabling customers to forecast as well as put bounds on their usage costs by specifying the performance policies because server-less computing works on a pay-as-you-go for the resources used model. For example, an app that has a service level agreement that requires it finish within 100 ms will be charged only for the 100 ms used multiplied by the number of app deployments requested. In embodiments as disclosed herein, cloud providers are able to provide performance-based service level agreements, so that customers know what to expect in terms of performance and costs, guaranteeing end-to-end performance for server-less applications deployed on their platforms so that they become able to set up service level agreements with customers and meet their expectations.

In one embodiment of the present disclosure, a computer-implemented method is described for receiving, in an application orchestrator, a request for executing an application from a user in a client device. The application includes a function sequence including multiple functions to complete the application, wherein each function in the function sequence is executed in one of multiple instances. The computer-implemented method includes identifying an instance chain of the functions to complete the application, wherein the instance chain includes an instance for each function in the function sequence. The computer-implemented method includes tracking a performance characteristic of each instance for each function in the instance chain, and selecting an application execution route based on the performance characteristic of each instance, the application execution route including the instance chain of the functions to complete the application. The computer-implemented method also includes allocating a server resource to each instance for each function in the instance chain of the application execution route and modifying the application execution route based on an overall performance of the application and a performance policy of the application.

According to one embodiment, a system is described that includes an application orchestration engine configured to receive a request from a user for executing an application. The system also includes a template generator configured to identify a function sequence including multiple functions to complete the application, wherein each function in the function sequence is executed in one of multiple instances, and a template instantiator configured to identify an instance chain of the functions to complete the application, wherein the instance chain includes an instance for each function in the function sequence. The system includes a monitoring engine configured to track a performance characteristic of each instance for each function in the instance chain, and a probabilistic policy engine configured to select an application execution route based on a probability of the performance characteristic of each instance. The application execution route includes the instance chain of the functions to complete the application.

According to one embodiment, a non-transitory, machine readable medium is described that includes instructions, which when executed by one or more processors, cause a computer to perform a method for receiving, in an application orchestrator, a request for executing an application from a user in a client device. The method includes identifying a function sequence including multiple functions to complete the application, wherein each function in the function sequence is executed in one of multiple instances and identifying an instance chain of the functions to complete the application, wherein the instance chain includes an instance for each function in the function sequence. The method includes tracking a performance characteristic of each instance for each function in the instance chain and selecting an application execution route based on the performance characteristic of each instance, the application execution route including the instance chain of the functions to complete the application. The method includes allocating a server resource to each instance for each function in the instance chain of the application execution route and modifying the application execution route based on an overall performance of the application and a performance policy of the application.

In yet other embodiment, a system is described that includes a means for storing commands and a means for executing the commands causing the system to perform a method that includes receiving, in an application orchestrator, a request for executing an application from a user in a client device. The method includes identifying a function sequence including multiple functions to complete the application, wherein each function in the function sequence is executed in one of multiple instances and identifying an instance chain of the functions to complete the application, wherein the instance chain includes an instance for each function in the function sequence. The method includes tracking a performance characteristic of each instance for each function in the instance chain and selecting an application execution route based on the performance characteristic of each instance, the application execution route including the instance chain of the functions to complete the application. The method includes allocating a server resource to each instance for each function in the instance chain of the application execution route and modifying the application execution route based on an overall performance of the application and a performance policy of the application.

In one embodiment, a computer-implemented method as disclosed herein includes receiving, in an application orchestrator and from an application provider, a request for loading an application including of a function sequence, wherein the function sequence includes multiple functions to complete the application, and wherein each function in the function sequence is executed in one of multiple instances of a particular function. The computer-implemented method further includes identifying an instance chain of the functions to complete the application, wherein the instance chain comprises an instance for each function in the function sequence, tracking a performance characteristic of each instance for each function in the instance chain, and selecting an application execution route based on the performance characteristic of each instance, the application execution route comprising the instance chain of the functions to complete the application. The computer-implemented method also includes allocating a server resource to each instance for each function in the instance chain of the application execution route and modifying the application execution route based on an end-to-end performance of the application and a performance policy of the application.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

FIG. 1 illustrates an example architecture 10 for deployment of a server-less application in a cloud computing environment. Architecture 10 includes application orchestrator 100, servers 130 and client devices 110 connected over a network 150. One of the many servers 130 is configured to host a memory including instructions which, when executed by a processor, cause the server 130 to perform at least some of the steps in methods as disclosed herein. In some embodiments, the processor is configured to perform an application running in one or more of client devices 110. For purposes of load balancing, multiple servers 130 can host memories including instructions to one or more processors to perform an instance of one of multiple functions to complete the application.

Servers 130 may include any device having an appropriate processor, memory, and communications capability for hosting at least one instance of a function in a server-less application, and an application orchestrator engine 100. Any one of servers 130 may be accessible by various client devices 110 over network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing the server-less application in one or more of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Architecture 10 enables cloud providers to provide performance guarantees for server-less applications. This helps to increase revenue by enabling a differentiated service which leads to more customers and enables optimal app placement which in turn results in efficient resource usage, saving energy and usage costs for the cloud provider. Also, Architecture 10 enables accountability for the cloud provider thus fulfilling the goal of server-less computing where cloud providers rather than customers are accountable for application performance. Accordingly, embodiments as disclosed herein include more reliable server-less provider and enable declarative management for applications, that is, the customer or developer of the app only needs to declaratively specify the app performance policy or intent and the cloud provider handles the policy implementation using our invention. Thus, simplifying things for the customer.

Architecture 10 allows distributed deployment of functions in applications so that a distributed topology of servers 130 is efficiently utilized while maintaining app performance-based service level agreements. Architecture 10 allows customers to estimate and limit their usage costs by writing performance-based service level agreements that take into account the fine-grained, pay-as-you-go for the resources you are using model of server-less computing. Architecture 10 is able to handle the uncertain nature of server-less computing and maintains app performance-based service level agreements by continuously monitoring the cloud state and re-orchestrating applications when needed. In some embodiments, architecture 10 uses probabilistic programming as policy specification language which is a natural fit for probabilistic policy specification in server-less computing, thus simplifying the specification task for developers.

Figure 2:
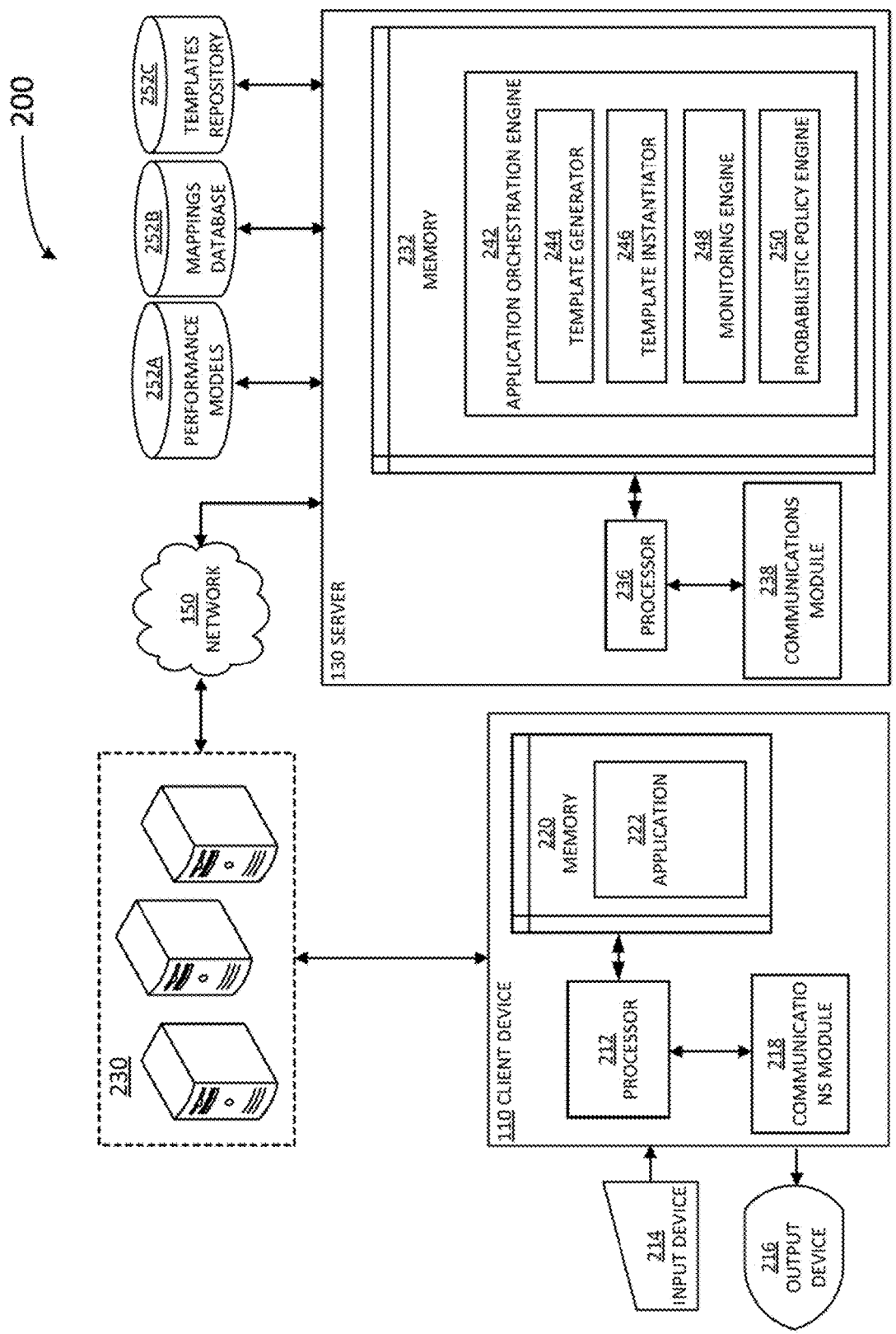
FIG. 2 is an architecture illustrating an example server and client from the architecture of FIG. 1, according to certain aspects of the disclosure.

FIG. 2 is a server-less platform 200 for cloud computing of applications illustrating an example server 130 and client device 110 in the architecture 10 of FIG. 1, according to certain aspects of the disclosure. Client device 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards. Client device 110 may also be coupled with an input device 214 and an output device 216. Input device 214 may include a mouse, a keyboard, a touchscreen and the like. Output device 216 may include a display, a touchscreen, a microphone, and the like. In some embodiments, input device 214 and output device 216 may be included in the same unit (e.g., a touchscreen).

Server 130 includes a memory 232, a processor 236, and communications module 238. Processor 236 is configured to execute instructions, such as instructions physically coded into processor 236, instructions stored in memory 232, or a combination of both. In some embodiments, an application 222 in client device 110 may be installed by server 130 and perform scripts and other routines provided by server 130. Execution of application 222 may be controlled by a processor 212 in client device 110.

Memory 232 includes an application orchestration engine 242 configured to receive a request from a user for executing an application. Application orchestration engine 242 includes a template generator 244 configured to identify a function sequence including multiple functions to complete the application, wherein each function in the function sequence is executed in one of multiple instances.

Server-less platform 200 further includes multiple servers 230 communicatively coupled with each other, with client device 110, and with server 130, through network 150. Each of servers 230 may be configured to perform at least one instance of at least one of the multiple functions to complete application 222. Accordingly, each of servers 230 includes server resources that may be allocated appropriately by server 130 to modify the application execution route from a first instance to a second instance based on a confidence level for the performance characteristic of each instance and a performance policy of the application.

Application orchestration engine 242 also includes a template instantiator 246 configured to identify an instance chain of the functions to complete the application, wherein the instance chain includes an instance for each function in the function sequence. In some embodiments, application orchestration engine 242 includes a monitoring engine 248 configured to track a performance characteristic of each instance for each function in the instance chain. In some embodiments, monitoring engine 248 is configured to periodically monitor a performance of at least one instance of each function in application 222. In some embodiments, monitoring engine 248 is configured to request an application state from a server hosting an instance of a function in the application execution route. In some embodiments, monitoring engine 248 is configured to evaluate a performance distribution of latency of at least one instance for one function (e.g., in any one of servers 230). In some embodiments, monitoring engine 248 is configured to retrieve a packet throughput of at least one instance node for a function. Application orchestration engine 242 also includes a probabilistic policy engine 250 configured to select an application execution route based on a probability of the performance characteristic of each instance, the application execution route including the instance chain of the functions to complete the application.

Server-less platform 200 also illustrates a performance models database 252A, a mappings database 252B storing network mappings and prior execution routes, and a templates repository 252C storing application templates for user selection, which are communicatively coupled with server 130 (e.g., through network 150, through each other, or separately).

In some embodiments, server-less platform 200 provides application developers a way to specify server-less functions for an application (e.g., application 222) in a vendor-agnostic way. Accordingly, application 222 may be deployed on any supported server-less platform 200 without needing to know the details of the native cloud API for each of multiple cloud architecture providers. In some embodiments, application orchestration engine 242 provides a template specification language (e.g., through template generator 244 and template instantiator 246) allowing application developers to specify server-less functions for deployment of application 222. The corresponding application orchestration engine 242 deploys the function sequence on any supported server-less cloud the user chooses.

In some embodiments, server-less framework's template specification may be extended to support additional features, e.g. ways to specify location variables to enable deployment of applications such that their functions are distributed in different locations for optimal performance or cost savings, or federation across clouds where one app's functions are deployed on clouds from different vendors. Server-less platform 200 allows templates generated with template generator 244 to have a specification of variables that can be dynamically populated. In some embodiments, this capability is desirable to make attributes such as, location, and CPU/memory configurations, dynamically populated variables. Application templates generated by template generator 244 are then pushed to a templates repository 252C. Each template is also annotated with a unique host name which developers can use to instantiate the application multiple times. In some embodiments, a unique identifier is selected as the application name and can be used by any client to access an instance of the application template.

Once an application template is in templates repository 252C, a monitoring engine 248 is notified. Monitoring engine 248 picks new application templates from templates repository 252C and instantiates it in various configurations (in terms of location, cloud vendor, CPU, memory, programming language), and collects performance measurements (function latency, error rates, and the like). Monitoring engine 248 then builds performance models that capture function performance in various configurations, which are stored in performance models database 252A. For simplicity and for illustration purposes, without limitation, a latency variable will be used hereinafter as an example of a performance metric that the service level agreement specifies. Other performance metrics, such as error rates, or monetary costs, can be supported in a similar manner by our system.

In some embodiments, monitoring engine 248 uses template instantiator 246 to instantiate the application templates. Template instantiator 246 removes any specific information from server-less platform 200, and monitoring engine 248 specifies the name of the application and its configuration, to proceed (cf. Table III, below). In some embodiments, template instantiator 246 takes an application template from templates repository 252C and instantiates the template on the server-less platform 200 by populating the variables in the template using values provided as input by monitoring engine 248. Accordingly, monitoring engine 248 provides values for variables for the cloud vendor, location, CPU/memory configurations, programming language, and the like.

In some embodiments, template instantiator 246 contacts multiple providers of server-less platform 200 to instantiate overall/complete application 222. As a result, server-less platform 200 starts up function containers for the various functions in application 222. In some embodiments, server-less platform 200 maintains the container in a paused state once the function execution ends, and gives back the IP address of the container for each instantiated function that monitoring engine 248 stores as the app configuration (e.g., 'mapping') in a mappings database 252B. The IP address for each instantiated function in the mapping can later be used by client device 110 to access or invoke the paused function instance (as part of invoking application 222). As the application is instantiated in various configurations, monitoring engine 248 retrieves logs for the functions in application 222, and analyzes them to generate performance models for individual functions, and storing the performance models in performance models database 252A. The performance models may include probabilistic analysis carried out by a probabilistic policy engine 250. Some of the probabilistic analysis may include cumulative distribution functions (CDFs) for the function latency under the given deployment configuration. A deployment configuration may include entries such as: vendor, location, memory, language, and the like.

In some embodiments, mappings database 252B may include tabulated data as shown in Table I.

TABLE I

| AppID | Mapping from each function in app to currently eligible containers' IP addresses | Free (Is the container in use?) |
|---|---|---|
| $App_1$ | $App_1\text{-func}_1 \rightarrow [1.1.1.1, 2.2.2.2]$ | $App_1\text{-func}_1 \rightarrow$ [Yes, No] |
| $App_2$ | $App_2\text{-func}_1 \rightarrow [3.3.3.3, 4.4.4.4]$, $App_2\text{-func}_2 \rightarrow [5.5.5.5]$ | $App_2\text{-func}_1 \rightarrow$ [Yes, Yes], $App_2\text{-func}_2 \rightarrow$ [Yes] |

In some embodiments, mappings database 252B may include tabulated data as shown in Table II, below.

TABLE II

| Apps | App func -> Currently eligible IP/cID | Free |
| --- | --- | --- |
| App1 | {A₁f1->IP1/cID1} | Yes |
| App2 | {A₂f1->IP3/cID3, A₂f2->IP4/cID4} | Yes |
| App1 | {A₁f1->IP6/cID6} | No |

In further embodiments, mappings database 252B may include tabulated data as shown in Table III, below.

TABLE III

| Unique names | Hostname |
| --- | --- |
| App1 | hostname/App1 |
| App2 | hostname/App2 |

Figure 3:
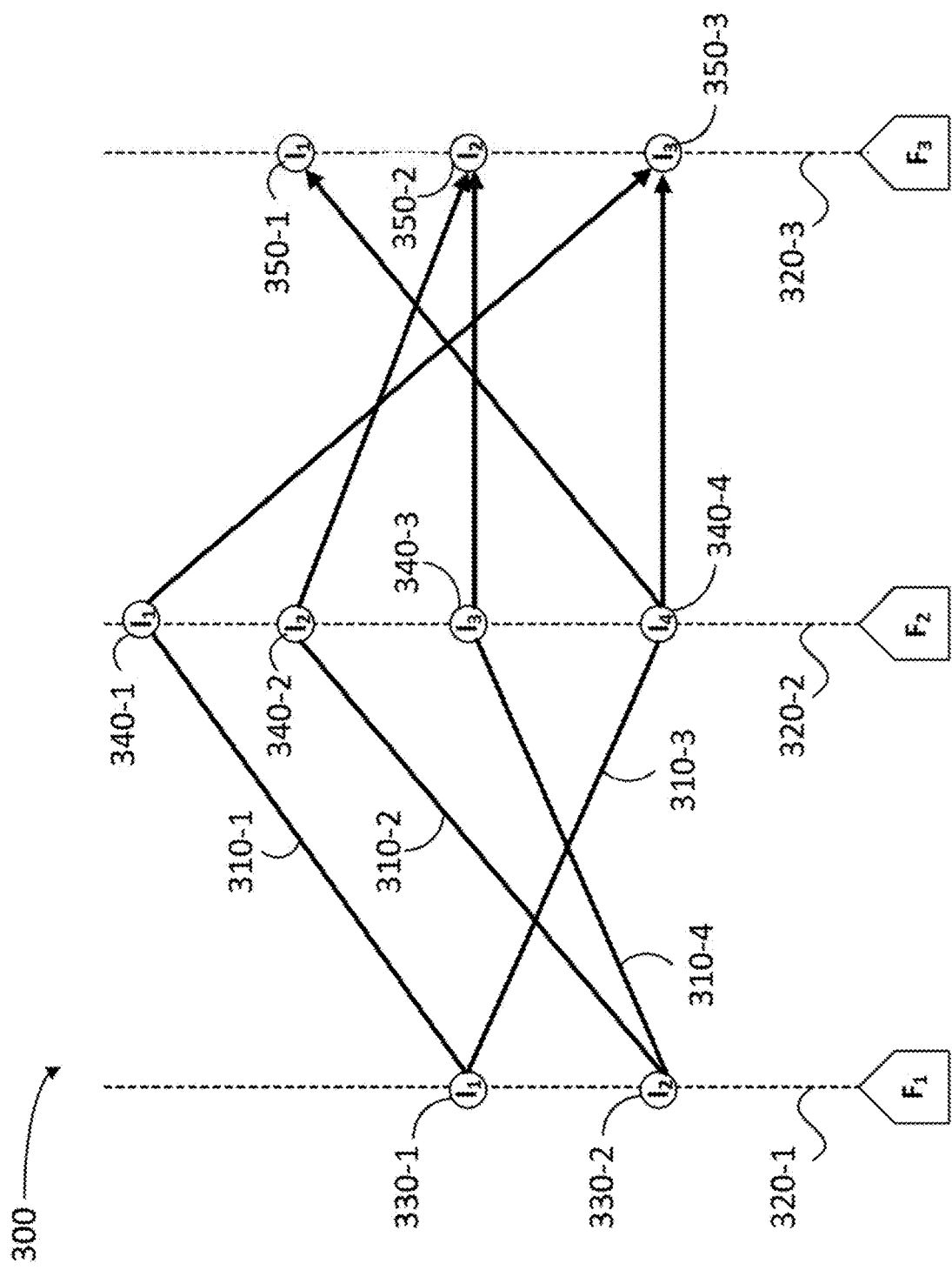
FIG. 3 illustrates multiple instance chains of functions to complete an application, according to some embodiments.

FIG. 3 illustrates multiple instance chains 310-1, 310-2, 310-3, and 310-4 (hereinafter, collectively referred to as "instance chains 310") of functions 320-1, 320-3, and 320-4 (hereinafter, collectively referred to as "functions 320") to complete an application 300, according to some embodiments. Function 320-1 may include instances 330-1 and 330-2 (hereinafter, collectively referred to as "instances 330"). Function 320-2 includes instances 340-1, 340-2, 340-3, and 340-4 (hereinafter, collectively referred to as "instances 340"). And function 320-3 includes instances 350-1, 350-2, and 350-3 (hereinafter, collectively referred to as "instances 350").

Accordingly, instance chain 310-1 includes instances 330-1, 340-1, and 350-3. Instance chain 310-2 includes instances 330-2, 340-2, and 350-2. Instance chain 310-3 includes instances 330-1, 340-4, and 350-1. And instance chain 310-4 includes instances 330-2, 340-3, and 350-2.

Instance chains 310 provide a wide variety of deployment opportunities for application developers, especially when application 300 includes more than one function 320 or for deployment of app functions to be distributed across different cloud vendors. Accordingly, embodiments as disclosed herein remove the burden on the application developer to figure out the routing between the functions in their applications and decide which locations are optimal for placement of each function 320. Since cloud platforms are inherently probabilistic, dynamic deployment of instance chains 310 may better satisfy performance policies of application 300.

In some embodiments, server-less application 300 may be designed in a micro-service fashion with a set of one or more small semi-autonomous self-contained functions linked together to create application 300. The underlying server-less computing environment on which application 300 is deployed may include a distributed cloud with multiple instances 330, 340 and 350 available at various locations, with varying edge latencies, resource configurations, amount of load on the servers, cost models, and the like. Functions 320 may be distributed across a cloud in any fashion, as long as the performance specifications of application 300 are met. Each function 320 has an individual response time or latency that can depend on various factors such as: server resource configurations (CPU/memory), or noise level introduced by other tenants sharing the same server as this function (functions run in containers and multiple containers can be run concurrently on a server or VM) which depends on the type of bin packing algorithm used by the cloud provider. Further, in some embodiments there might be inter-function latencies e.g. when functions 320 are distributed across cloud regions then network latencies between the cloud instances are dependent on current network traffic load. In some embodiments, a source of uncertainty can come from cold starts or warm starts for containers that run the functions. All these latencies combine to make up the end-to-end app latency. While all the individual latencies contribute to the end-to-end app performance uncertainty, customers care about and specify the end-to-end app latency in the app performance policies and this is what we need to guarantee as part of the performance-based service level agreement. Embodiments as disclosed herein provide policy guarantees such as "my end-to-end app latency should not exceed above 100 ms with 95% probability."

Figure 4:
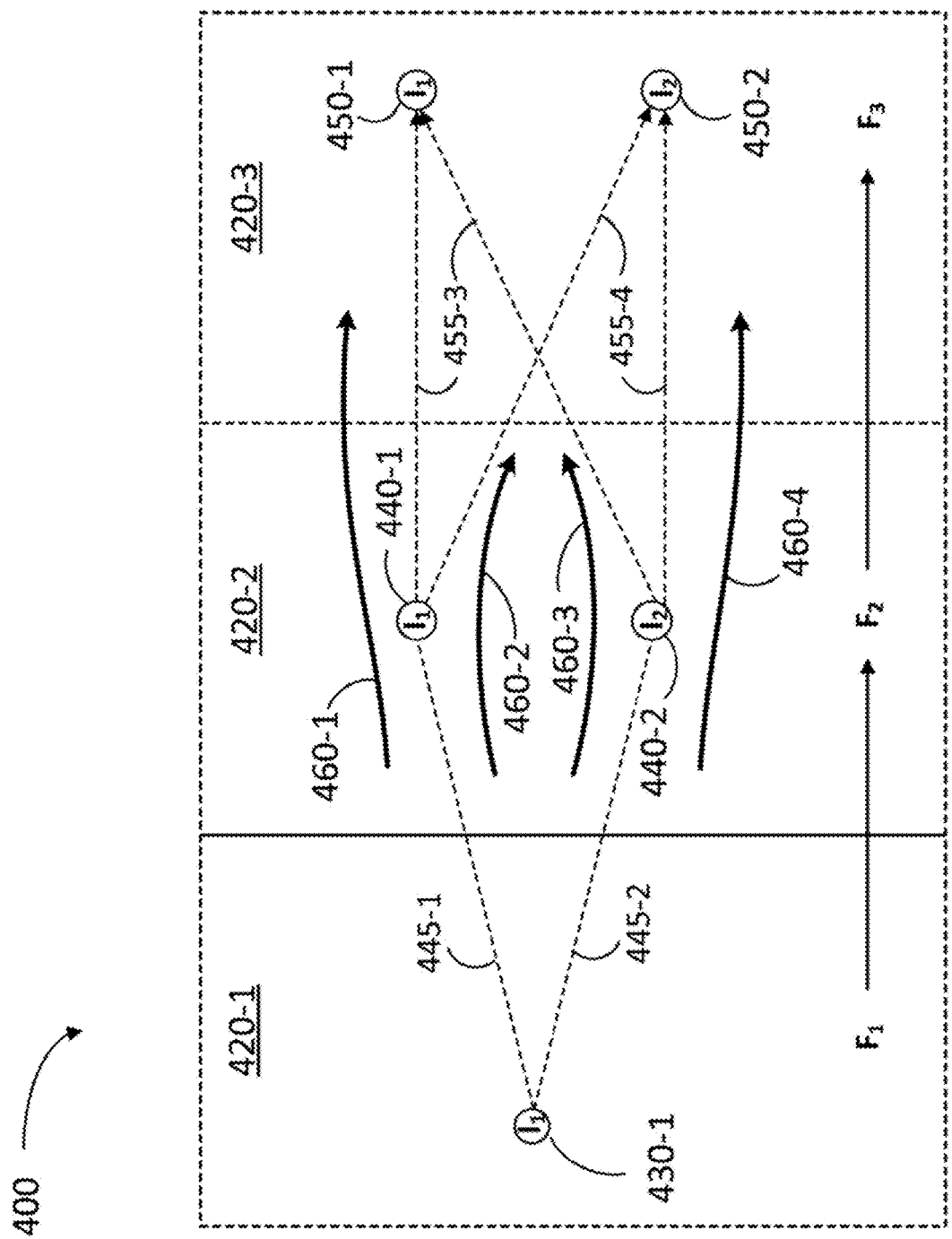
FIG. 4 illustrates tracks of a performance characteristics for multiple instances in a function sequence for an application, according to some embodiments.

FIG. 4 illustrates a track of a performance characteristic for each instance in a function sequence 400 for an application, according to some embodiments. Function sequence 400 includes three functions: function 420-1 (f1), function 420-2 (f2), and function 420-3 (f3), hereinafter, collectively referred to as "functions 420." Each one of functions 420 includes one or more instances. For example, function 420-1 may be operated in instance 430-1 (I1). Function 420-2 may be operated in instances 440-1 (I1) and 440-2 (I2), hereinafter collectively referred to as "instances 440." And function 420-3 may be operated in instances 450-1 (I1) and 450-2 (I2), hereinafter collectively referred to as "instances 450." Accordingly, function sequence 400 may include a total of four instance chains 460-1, 460-2, 460-3 and 460-4, hereinafter collectively referred to as "instance chains 460."

Instance chains 460 are as follows: Instance chain 460-1 includes instance 430-1 for function 420-1 (I1(f1)), followed by instance 440-1 for function 420-2 (I1(f2)), and followed by instance 450-1 for function 420-3 (I1(f3)). Instance chain 460-2 includes instance 430-1 for function 420-1 (I1(f1)), followed by instance 440-1 for function 420-2 (I1(f2)), and followed by instance 450-2 for function 420-3 (I2(f3)). Instance chain 460-3 includes instance 430-1 for function 420-1 (I1(f1)), followed by instance 440-2 for function 420-2 (I2(f2)), and followed by instance 450-1 for function 420-3 (I1(f3)). Instance chain 460-4 includes instance 430-1 for function 420-1 (I1(f1)), followed by instance 440-2 for function 420-2 (I2(f2)), and followed by instance 450-2 for function 420-3 (I2(f3)).

In some embodiments, at each junction in the function sequence a system as disclosed herein may distribute the instances of the next function with a probability distribution. For example, at the junction between f1 420-1 and f2 420-2, the system may select an instance chain including instance 440-1 in f2 420-2 with a probability rate of p1 445-1. Likewise, the system may select an instance chain including instance 440-2 in f2 420-2, with a probability rate p2 445-2. In some embodiments, p1 (445-1)+(p2 445-2)=1. Further, at the junction between f2 420-2 and f3 420-3, the system may select an instance chain including instance 450-1 in f3 420-3 with a probability rate of p3 455-3. Likewise, the system may select an instance chain including instance 450-2 in f3 420-3, with a probability rate p4 455-4. In some embodiments, (p3 455-3)+(p4 455-4)=1.

In sum, the accumulated probability (pf) for instance chains 460 may be estimated as shown below in Eqs. 1.1 through 1.4:

$$Pf_1(460-1) = p1 \times p3 \tag{1.1}$$

$$Pf_2(460-2) = p1 \times p4 \tag{1.2}$$

$$Pf_3(460-3) = p2 \times p3 \tag{1.3}$$

$$Pf_4(460-4) = p2 \times p4 \tag{1.4}$$

Figure 5A:
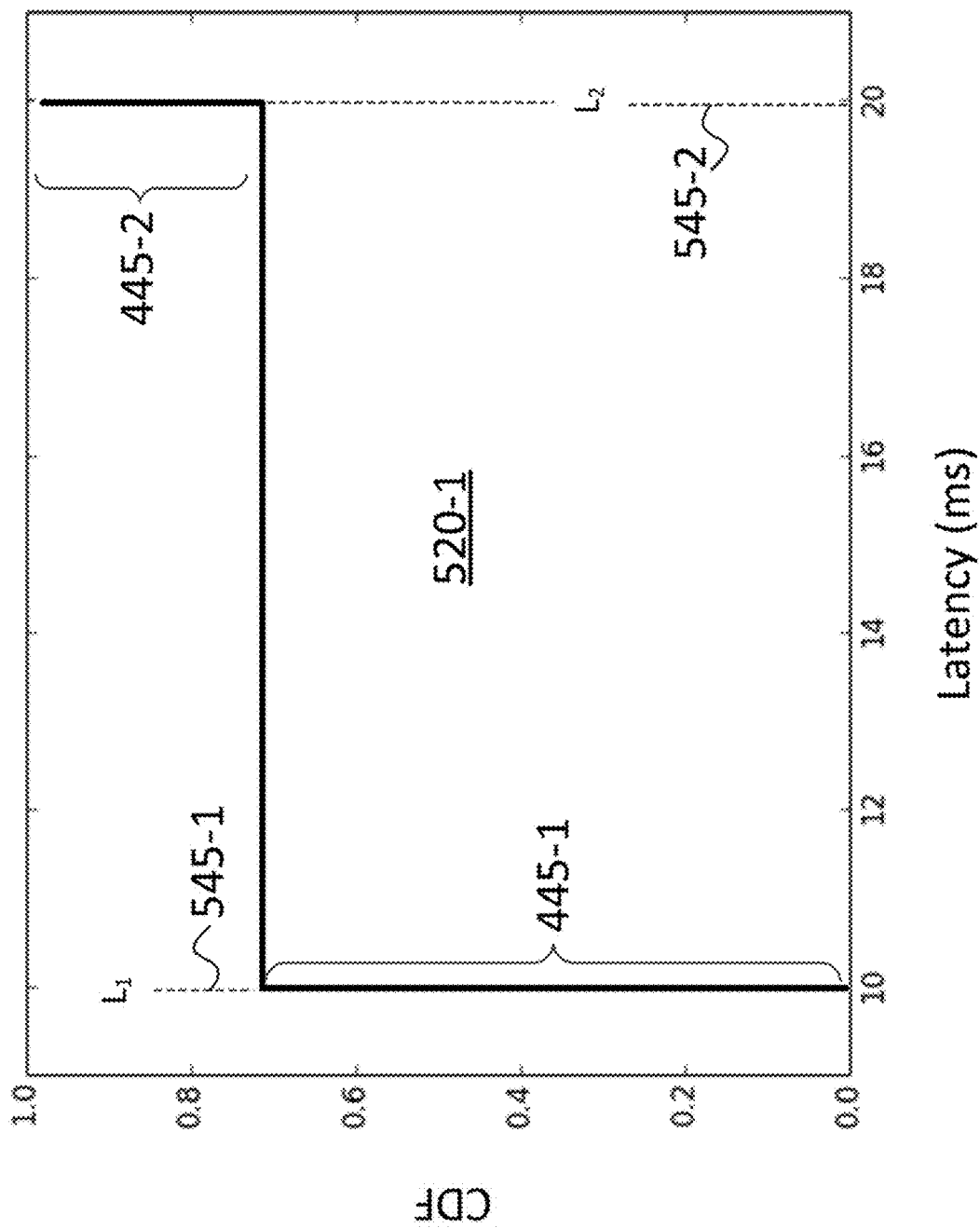
FIGS. 5A-C illustrate cumulative density functions (CDFs) for a performance characteristic of the different instance chains in the function sequence of FIG. 4, according to some embodiments.
Figure 5B:
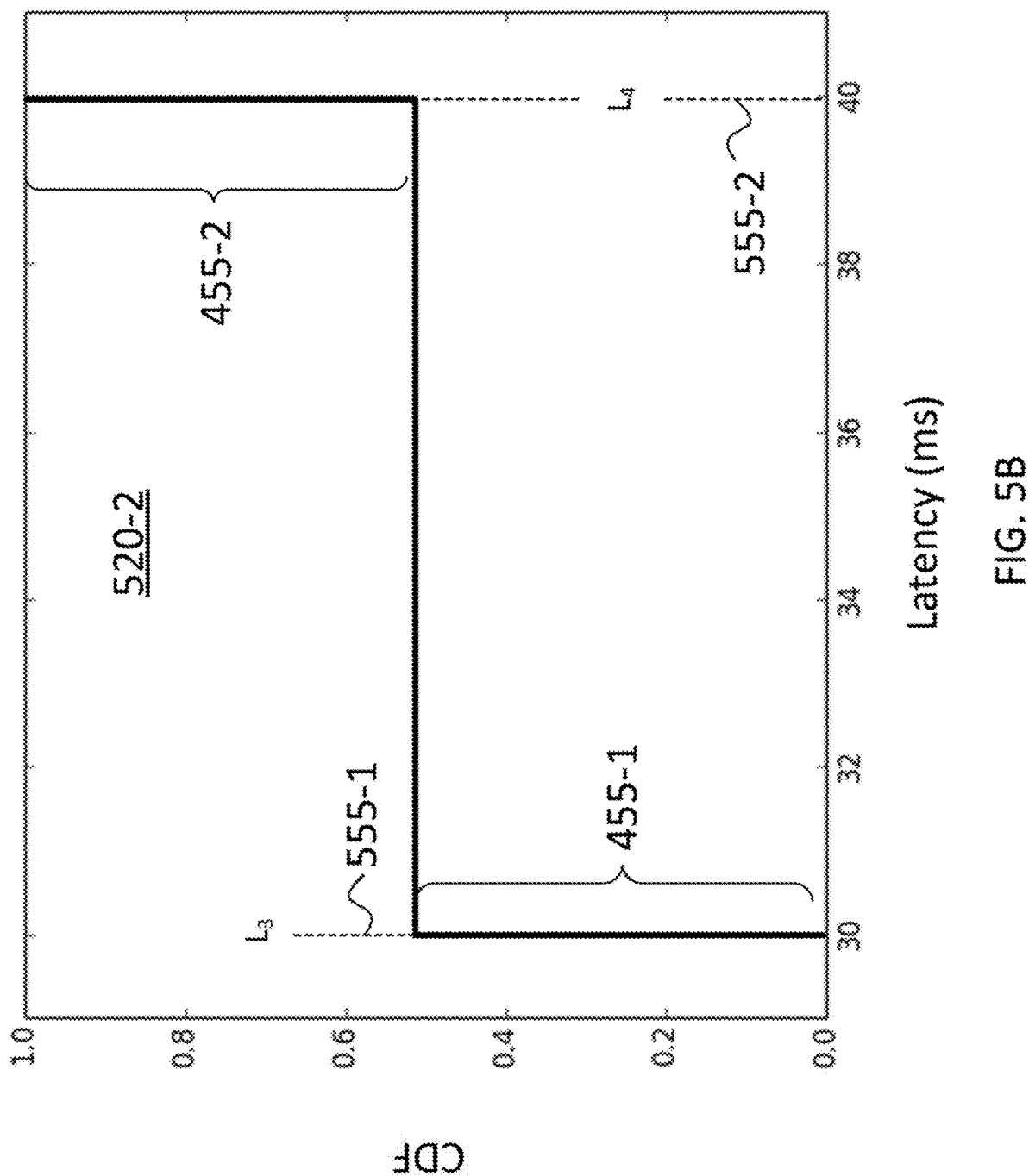
Figure 5C:
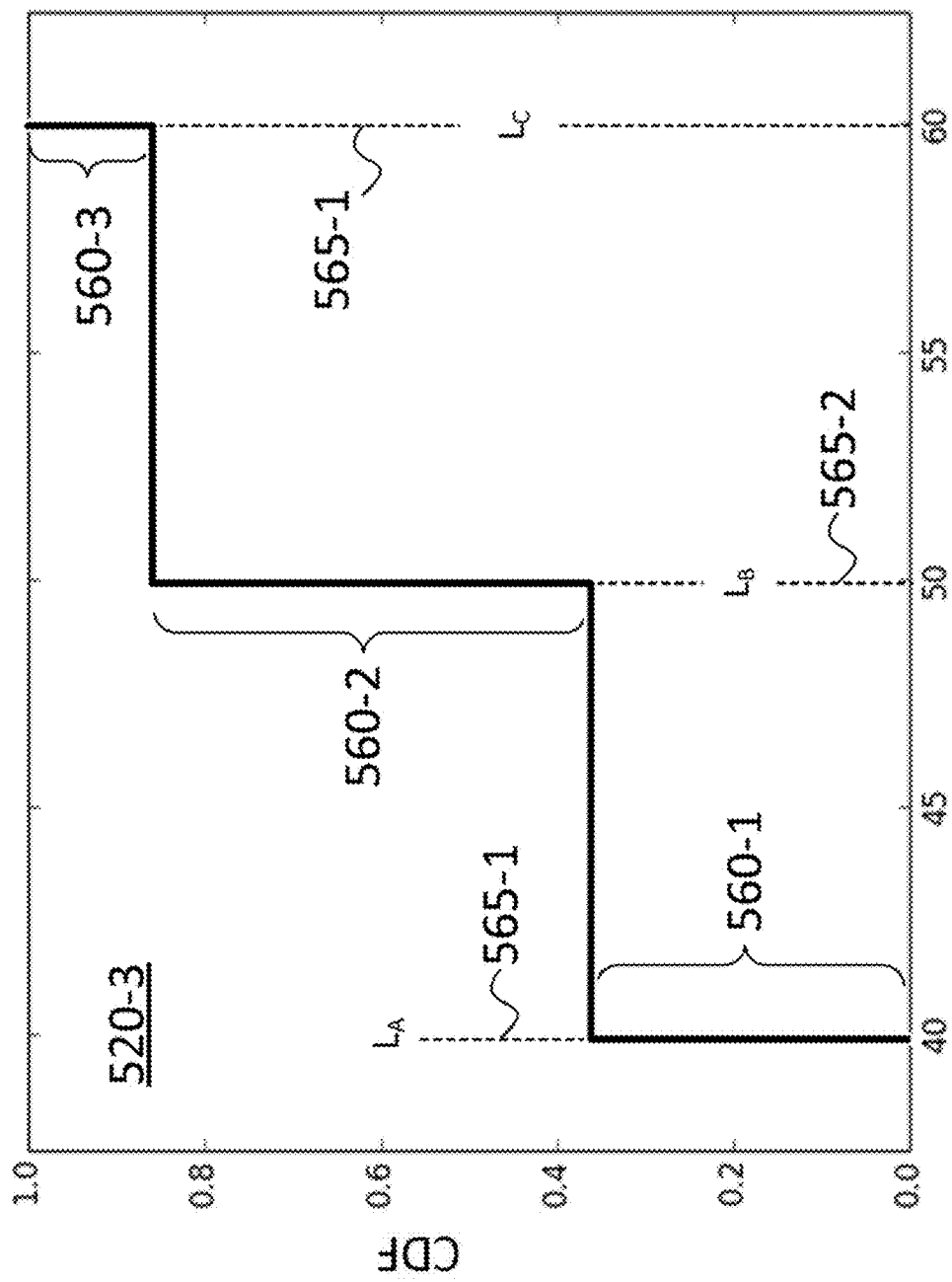

FIGS. 5A-C illustrate CDFs 520-1, 520-2, and 520-3 (hereinafter, collectively referred to as "CDFs 520") for a performance characteristic of instance chains 460 in function sequence 400, according to some embodiments. For illustrative purposes only, the performance characteristic illustrated is a latency (time to completion of a given task). The abscissae in CDFs 520 (X-axis) indicates the latency value (in milliseconds, ms), and the ordinate in CDFs 520 (Y-axis) indicates an accumulated probability for the given latency value, Ls (cdf=$\int^{L_s}$p).

FIG. 5A illustrates a CDF 520-1 for the first stage in function sequence 400 (e.g., the latency of stage 420-1). Instance 430-1 adds a latency of 10 ms (545-1, $L_1$) with a p1 445-1 probability of 70% (0.7 p), and a latency of 20 ms (545-2, $L_2$) with a p2 445-2 probability of 30% (0.3p). Thus, CDF 520-1 for f1 is a stepwise function with a 0.7 step at L1=10 ms and a 0.3 additional step at L2=20 ms.

FIG. 5B illustrates a CDF 520-2 for the second stage in function sequence 400 (e.g., the latency of stage 420-2). Instance 440-2 adds a latency of 30 ms (555-1, $L_3$) with a p3 455-3 probability of 50% (0.5 p), and a latency of 40 ms (555-2, $L_4$) with a p4 455-4 probability of 50% (0.5p). Thus, CDF 520-2 for f2 is a stepwise function with a 0.5 step at L3=30 ms and a 0.5 additional step at L4=40 ms.

FIG. 5C illustrates a performance characteristic of instance chains 460 CDF 520-3, where the sequence f1-f2 is involved. Accordingly, instance chain 460-1 is associated with a total latency of 10 ms (545-1)+30 ms (555-1)=40 ms (LA) and a probability 565-1 equal to p1 445-1*p3 455-3 (cf. Eq. 1.1, e.g. 0.7×0.5=0.35). Likewise, instance chain 460-2 is associated with a total latency of 10 ms (545-1)+40 ms (555-2)=50 ms (LB), and instance 460-3 also gives a latency of 20 ms (545-2)+30 ms (555-1)=50 ms (LB). Accordingly, latency LB is associated with a CDF jump 565-2 equal to p1 445-1*p4 455-4+p2 445-2*p3 455-1 (cf. Eq. 1.2, e.g. 0.7×0.5+0.3×0.5=0.50). And instance chain 460-4 is associated with a total latency of 20 ms+40 ms=60 ms and a jump in CDF 560-3 equal to p2 445-2*p4 455-4=0.3×0.5=0.15.

Figure 6:
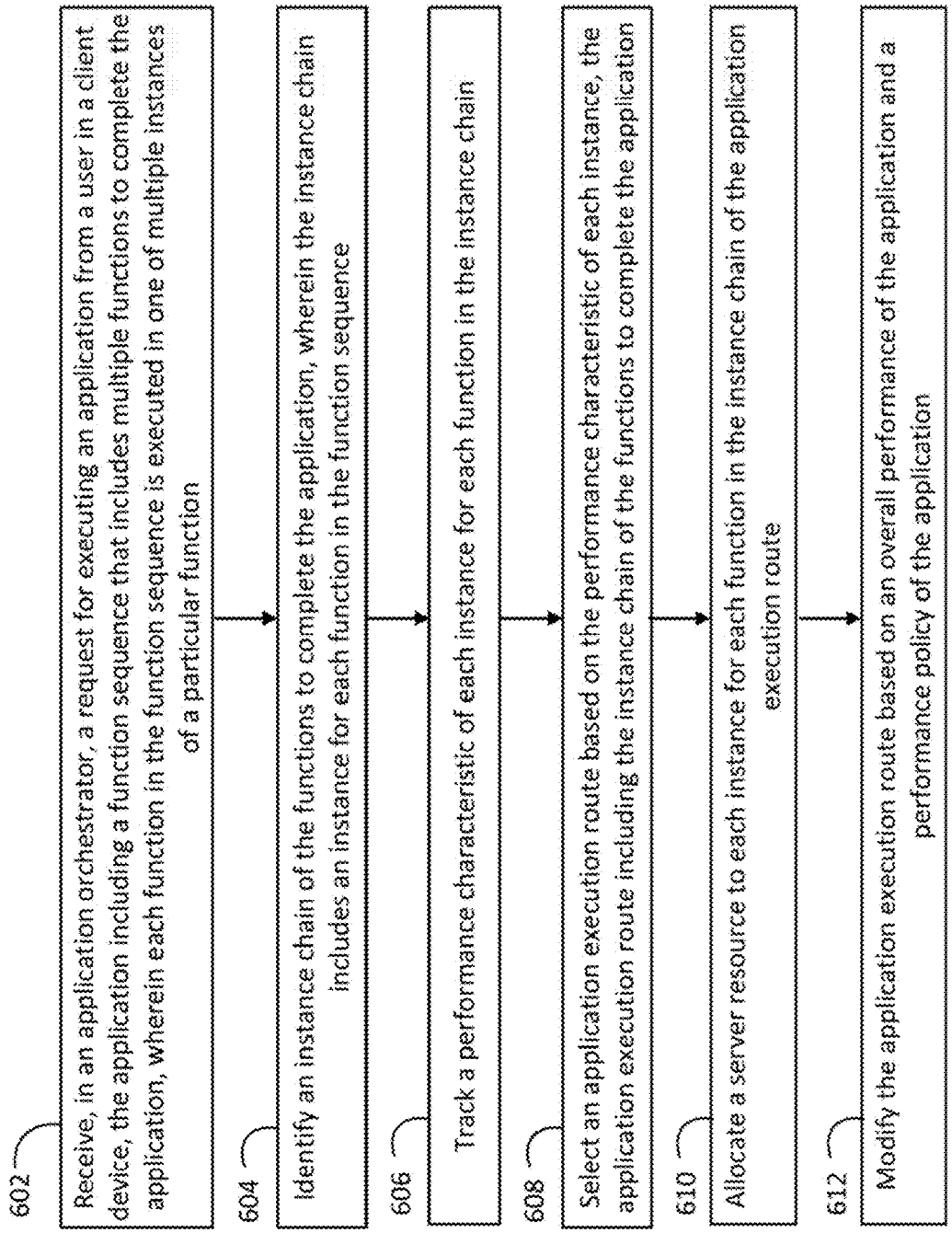
FIG. 6 is a flow chart illustrating steps in a method for orchestrating a distributed application deployment, according to some embodiments.

FIG. 6 is a flow chart illustrating steps in a method 600 for orchestrating a distributed application deployment, according to some embodiments. Method 600 may be performed at least partially by any one of network servers, while communicating with any one of a plurality of client devices (e.g., any one of servers 130 and any one of client devices 110). The servers may be hosting a plurality of instances of functions configured to form a sequence to perform at least a portion of an application installed in at least one of the client devices (e.g., application 222). The client devices may be handled by a user, wherein the user may be registered to a private account with the server, or may be a visitor to the server website or logged in a server application and an application element installed in the client device. At least some of the steps in method 600 may be performed by a computer having a processor executing commands stored in a memory of the computer (e.g., processors 212 and 236, memories 220 and 232). Further, steps as disclosed in method 600 may include retrieving, editing, and/or storing files in a database that is part of, or is communicably coupled to, the computer, using, inter alia, an application orchestration engine (e.g., application orchestration engine 242). The database may include any one of a performance models database and a mappings database (e.g., performance model database 252A and mappings database 252B). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes receiving, in an application orchestrator, a request for executing an application from a user in a client device. The application includes a function sequence having multiple functions to complete the application, wherein each function in the function sequence is executed in one of multiple instances.

Step 604 includes identifying an instance chain of the functions to complete the application, wherein the instance chain includes an instance for each function in the function sequence. In some embodiments, step 604 includes pre-deploying the instance chain, and allocating a first portion of the request for executing the application to a first application execution route and allocating a second portion of the request for executing the application to a second application execution route.

Step 606 includes tracking a performance characteristic of each instance for each function in the instance chain. In some embodiments, step 606 includes periodically monitoring a performance of at least one instance of each function. In some embodiments, step 606 includes requesting an application state from a server hosting an instance of a function in the application execution route. In some embodiments, step 606 includes evaluating a performance distribution of latency of at least one instance for one function. In some embodiments, step 606 includes retrieving a packet throughput of at least one instance node for a function. In some embodiments, step 606 includes associating a performance value and a probability of achieving the performance value for the function in the instance.

Step 608 includes selecting an application execution route based on the performance characteristic of each instance, the application execution route including the instance chain of the functions to complete the application. In some embodiments, step 608 includes estimating a transit time of a data packet between different instances for different functions in an execution of the application. In some embodiments, step 608 includes selecting multiple instance chains of functions according to a maximum overall probability for the overall performance of the application.

Step 610 includes allocating a server resource to each instance for each function in the instance chain of the application execution route.

Step 612 includes modifying the application execution route based on an overall performance of the application and a performance policy of the application. In some embodiments, step 612 includes re-assigning a server resource from a first instance to a second instance based on a confidence level for the performance characteristic of each instance and the performance policy of the application.

Figure 7:
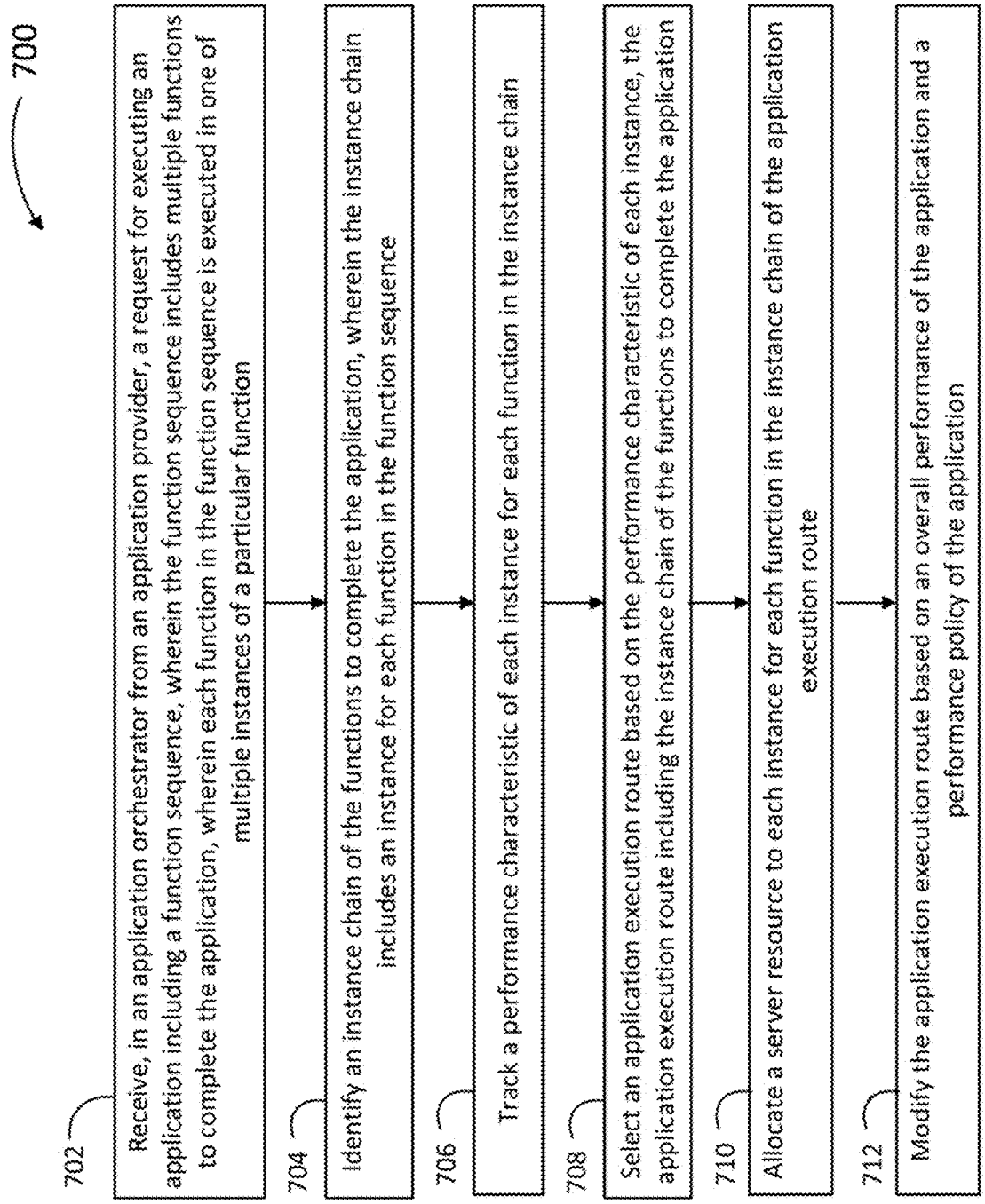
FIG. 7 is a flow chart illustrating steps in a method for uploading an application by an application developer in a distributed server network, according to some embodiments.

FIG. 7 is a flow chart illustrating steps in a method 700 for uploading an application by an application developer in a distributed server network, according to some embodiments. Method 700 may be performed at least partially by an application developer from one of a plurality of servers (e.g., any one of servers 130 and any one of client devices 110), and communicating with any one of a plurality of network servers hosting one or more instances of functions in a function sequence for end-to-end execution of an application (e.g., a server-less application, or application 222). The client devices may be handled by a user, wherein the user may be registered to a private account with the server, or may be a visitor to the server website or logged in a server application and an application element installed in the client device. At least some of the steps in method 700 may be performed by a computer having a processor executing commands stored in a memory of the computer (e.g., processors 212 and 236, memories 220 and 232). Further, steps as disclosed in method 700 may include retrieving, editing, and/or storing files in a database that is part of, or is communicably coupled to, the computer, using, inter-alia, an application orchestration engine (e.g., application orchestration engine 242). The database may include any one of a performance models database or a mappings database (e.g., performance models database 252A or mappings database 252B). Methods consistent with the present disclosure may include at least some, but not all of, the steps illustrated in method 700, performed in a different sequence. Furthermore, methods consistent with the present disclosure may include at least two or more steps as in method 700 performed overlapping in time, or almost simultaneously.

Step 702 includes receiving, in an application orchestrator and from an application provider, a request for loading an application including of a function sequence, wherein the function sequence includes multiple functions to complete the application, wherein each function in the function sequence is executed in one of multiple instances of a particular function.

In some embodiments, step 702 includes receiving an application flow graph depicting functions in the application, how they are linked together, and the application code. Accordingly, in some embodiments step 702 includes receiving code for the individual functions in an application, from the application developer. Further, in some embodiments, step 702 includes receiving overall application performance policies that serve as service level agreements. Different server-less platforms support one or more programming languages, and it has been observed that function response times can vary between functions implemented using varying languages. Accordingly, step 702 may include receiving multiple implementations of the application's functions in more than one programming languages (e.g., Python, JavaScript, Java, etc.) such that the code is equivalent in terms of the operations it performs. When multiple implementations are provided, step 702 includes dynamically picking the implementation that gives the best performance and thus satisfies the specified performance policy. In some embodiments, step 702 is performed by a template generator, and further includes constructing, with the template generator, a more detailed internal specification (e.g., the application template). In some embodiments, step 702 includes dynamically picking the values for the application deployment variables (e.g., location, CPU/memory configuration, and programming language) based on the application performance policy. In some embodiments, the template generator in step 702 adds the variables without instantiating or populating those variables with specific values (e.g. location=PaloAlto would be an instantiation of the location variable). In some embodiments, step 702 may include instantiating or populating those variables with a template instantiator.

Step 704 includes identifying an instance chain of the functions to complete the application, wherein the instance chain includes an instance for each function in the function sequence.

Step 706 includes tracking a performance characteristic of each instance for each function in the instance chain.

Step 708 includes selecting an application execution route based on the performance characteristic of each instance, the application execution route including the instance chain of the functions to complete the application.

Step 710 includes allocating a server resource to each instance for each function in the instance chain of the application execution route.

Step 712 includes modifying the application execution route based on an end-to-end performance of the application and a performance policy of the application.

Hardware Overview

Figure 8:
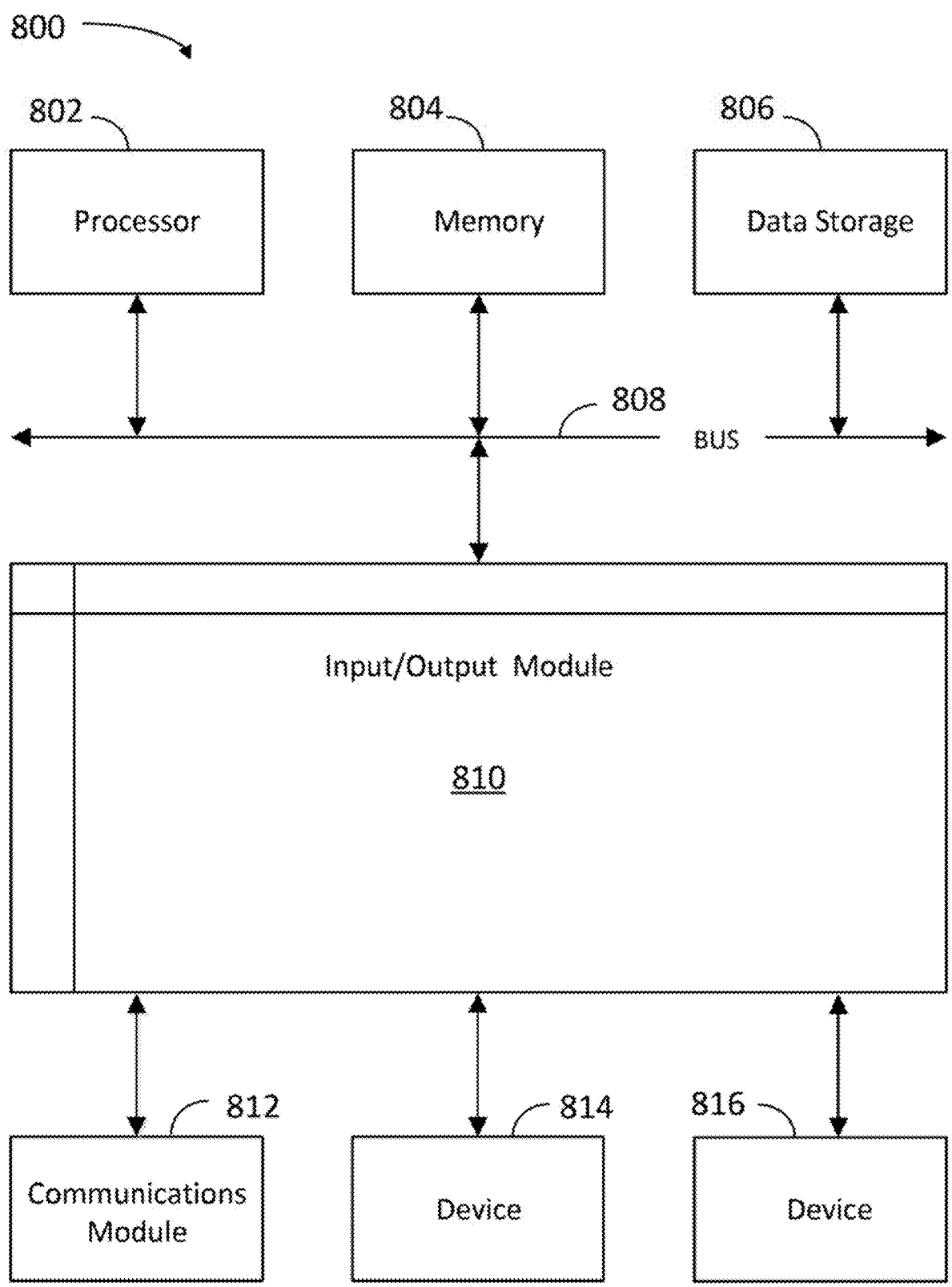
FIG. 8 is a block diagram illustrating an example computer system with which the client and server of FIGS. 1 and 2 and the methods of FIGS. 6 and 7 can be implemented.

FIG. 8 is a block diagram illustrating an exemplary computer system 800 with which the client device 110 and server 130 of FIGS. 1 and 2, and the methods of FIGS. 6 and 7 can be implemented. In certain aspects, the computer system 800 may be implemented using hardware or a combination of software and hardware, either in a dedicated server, or integrated into another entity, or distributed across multiple entities.

Computer system 800 (e.g., client device 110 and server 130) includes a bus 808 or other communication mechanism for communicating information, and a processor 802 (e.g., processors 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototypebased languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the client device 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
receiving, in an application orchestrator, a request for executing an application from a user in a client device, the application comprising a function sequence that includes multiple functions to complete the application, wherein each function in the function sequence is executed in one of multiple instances of a particular function;
identifying an instance chain of the functions to complete the application, wherein the instance chain comprises an instance for each function in the function sequence;
tracking a performance characteristic of each instance for each function in the instance chain;
selecting an application execution route based on the performance characteristic of each instance, the application execution route comprising the instance chain of the functions to complete the application;
allocating a server resource to each instance for each function in the instance chain of the application execution route; and
modifying the application execution route based on an overall performance of the application and a performance policy of the application.

2. The computer-implemented method of claim 1, wherein modifying the application execution route further comprises re-assigning a first instance having a first server resource to a second instance having a second server resource based on a confidence level for the performance characteristic of each instance and the performance policy of the application.

3. The computer-implemented method of claim 1, wherein tracking the performance characteristic of each instance for each function in the instance chain comprises periodically monitoring a performance of at least one instance of each function.

4. The computer-implemented method of claim 1, wherein tracking the performance characteristic of each instance for each function in the instance chain comprises requesting an application state from a server hosting an instance of a function in the application execution route.

5. The computer-implemented method of claim 1, wherein tracking a performance characteristic of each instance for each function comprises evaluating a performance distribution of latency of at least one instance for one function.

6. The computer-implemented method of claim 1, wherein tracking a performance characteristic of each instance for each function comprises retrieving a function request throughput of at least one instance node for a function.

7. The computer-implemented method of claim 1, wherein tracking a performance characteristic of each instance comprises associating a performance value and a probability of achieving the performance value for the function in the instance.

8. The computer-implemented method of claim 1, wherein identifying an instance chain of the functions to complete the application comprises pre-deploying the instance chain of functions, and allocating a first portion of the request for executing the application to a first application execution route and allocating a second portion of the request for executing the application to a second application execution route.

9. The computer-implemented method of claim 1, wherein selecting an application execution route comprises estimating a transit time of a function request between different instances for different functions in an execution of the application.

10. The computer-implemented method of claim 1, wherein selecting an application execution route comprises selecting multiple instance chains of functions according to a maximum overall probability for achieving the specified overall performance of the application.

11. A system comprising:
an application orchestration engine configured to receive a request from a user for executing an application;
a template generator configured to deploy a function sequence comprising multiple functions to complete the application, wherein each function in the function sequence is executed in one of multiple instances;
a template instantiator configured to identify an instance chain of the functions to complete the application, wherein the instance chain comprises an instance for each function in the function sequence;
a monitoring engine configured to track a performance characteristic of each instance for each function in the instance chain; and
a probabilistic policy engine configured to select an application execution route based on a probability of the performance characteristic of each instance, the application execution route comprising the instance chain of the functions to complete the application.

12. The system of claim 11, further comprising a server resource configured to modify the application execution route from a first instance to a second instance based on a confidence level for the performance characteristic of each instance and a performance policy of the application.

13. The system of claim 11, wherein to track the performance characteristic of each instance for each function in the instance chain the monitoring engine is configured to periodically monitor a performance of at least one instance of each function.

14. The system of claim 11, wherein to track the performance characteristic of each instance for each function in the instance chain the monitoring engine is configured to request an application state from a server hosting an instance of a function in the application execution route.

15. The system of claim 11, wherein to track the performance characteristic of each instance for each function in the instance chain the monitoring engine is configured to evaluate a performance distribution of latency of at least one instance for one function.

16. The system of claim 11, wherein to track the performance characteristic of each instance for each function the monitoring engine is configured to retrieve a packet throughput of at least one instance node for a function.

17. The system of claim 11, wherein to identify an instance chain of the functions to complete the application the template instantiator is configured to pre-deploy the instance chain, and to allocate a first portion of the request for executing the application to a first application execution route and allocating a second portion of the request for executing the application to a second application execution route.

18. A computer-implemented method, comprising:
receiving, in an application orchestrator and from an application provider, a request for loading an application comprising of a function sequence, wherein the function sequence comprises multiple functions to complete the application, wherein each function in the function sequence is executed in one of multiple instances of a particular function;
identifying an instance chain of the functions to complete the application, wherein the instance chain comprises an instance for each function in the function sequence;
tracking a performance characteristic of each instance for each function in the instance chain;
selecting an application execution route based on the performance characteristic of each instance, the application execution route comprising the instance chain of the functions to complete the application;
allocating a server resource to each instance for each function in the instance chain of the application execution route; and
modifying the application execution route based on an end-to-end performance of the application and a performance policy of the application.

19. The computer-implemented method of claim 18, further comprising reporting, to the application provider, an estimate of the end-to-end performance of the application.

20. The computer-implemented method of claim 18, further comprising receiving, from the application provider, the performance policy of the application.

* * * * *